United States Patent
Hart

[11] Patent Number: 6,000,743
[45] Date of Patent: Dec. 14, 1999

[54] VEHICLE DASH COVER

[76] Inventor: Francis R. Hart, 191 Landing La., Milledgeville, Ga. 31061

[21] Appl. No.: 08/885,912

[22] Filed: Feb. 20, 1998

[51] Int. Cl.⁶ .................................................... B62D 24/14
[52] U.S. Cl. ............................................ 296/70; 224/483
[58] Field of Search .................... 296/70, 208; 224/483, 224/482

[56] References Cited

U.S. PATENT DOCUMENTS

| | | | |
|---|---|---|---|
| 5,556,153 | 9/1996 | Kelman et al. | 296/70 |
| 5,709,601 | 1/1998 | Heck | 296/70 |
| 5,762,395 | 6/1998 | Merrifield et al. | 296/208 |

*Primary Examiner*—D. Glenn Dayoan
*Assistant Examiner*—Jason Morrow

[57] ABSTRACT

A molded dash cover which is a plastic molded form that fits across the top of an existing dashboard of the cab of a tractor trailer vehicle functions to aid an existing defroster vent system by directing the hot airflow more evenly and directly onto the windshield, thereby causing the windshield to defrost faster, and keep the wipers and windshield free of ice and snow build up, causing better visibility. By directing the hot airflow more directly onto the windshield and not into the cab of the truck, it stops the hot air from blowing into the drivers face. The device also serves as a shelf on the dashboard, enabling the driver to place small items therein without interfering with the defroster airflow.

1 Claim, 2 Drawing Sheets

VEHICLE DASH COVER

CROSS-REFERENCES TO RELATED APPLICATIONS

"Not applicable"

BACKGROUND OF INVENTION

Existing defroster systems air-flow ducts are positioned in the top of a vehicle dashboard, so that when the hot air flow is released, only a small portion of it actually is concentrated directly onto the windshield and the balance of the air flow is directed into the cab of the truck.

BRIEF SUMMARY OF THE INVENTION

It is the object of the present invention to provide an improvement to the above mentioned known condition.

The invention is a plastic form, molded by injection molding, sized to fit on top of an existing dash-board. It does not replace the existing defroster system, nor does it have a motor or electrical hook-up. It does not attach to anything or require tools to install. It merely sets on top of the existing dashboard.

BRIEF DESCRIPTION OF THE VIEWS OF THE DRAWINGS

The present invention will now be described, by way of example, with reference to the accompanying drawing, in which.

DESCRIPTION OF THE INVENTION

Figure 2:
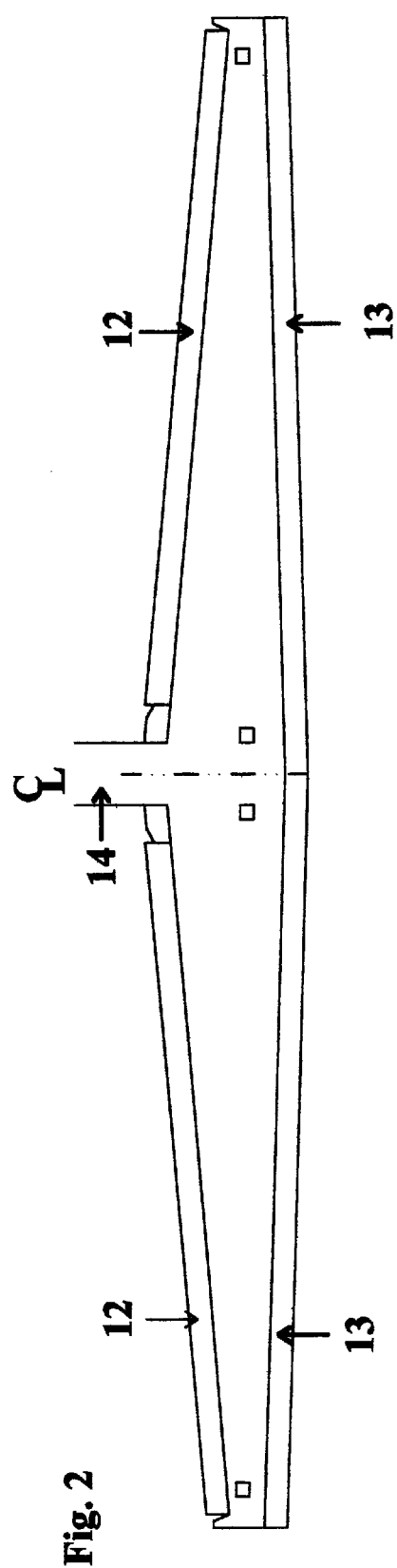
FIG. 2 is a front view of the invention.
Figure 3:
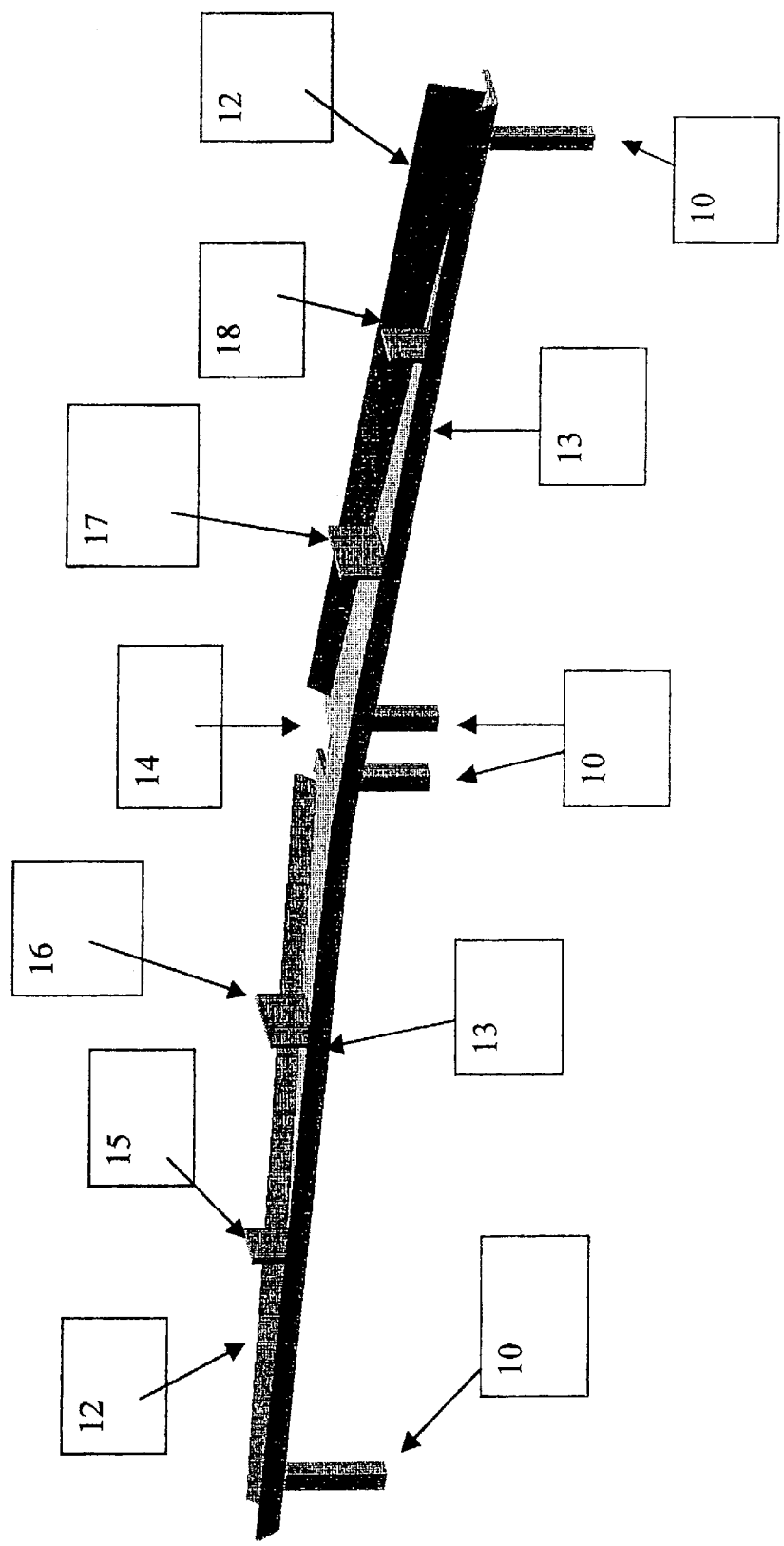
FIG. 3 is a perspective view of the invention.

Referring now to the drawing. The vehicle dash cover is positioned on an existing dash and it covers the entire dash and the air-ducts of an existing defroster system . See FIG. 2 and FIG. 3. When the hot airflow from the existing defroster hits the invention, it deflects and concentrates the airflow in a more direct, even and intense manner onto the windshield. Acting as a deflector, it enables 95% of the hot airflow coming from the present defroster to come in direct and even contact with the windshield.

The existing dashboard slopes on an angle downward to the windshield. The invention sits level from the dashboard to windshield, (see FIG. 2 ) resting ½ inch away from the windshield. Both front 13 and back 12 of the invention have a 1 inch edge running the full length of the invention. The edge 12 has a 2 inch opening 14 to allow the invention to fit around the 2 inch center molding 14 of a split windshield. see FIG. 2. and FIG. 3.

The front edge 13 is angled to seal tightly against the existing dash. The back edge 12 is angled to deflect the airflow against the windshield. Without the invention only 40% or less of the hot air-flow actually comes indirect contact with the windshield. The balance is directed into the drivers face and the cab of the truck.

Figure 1:
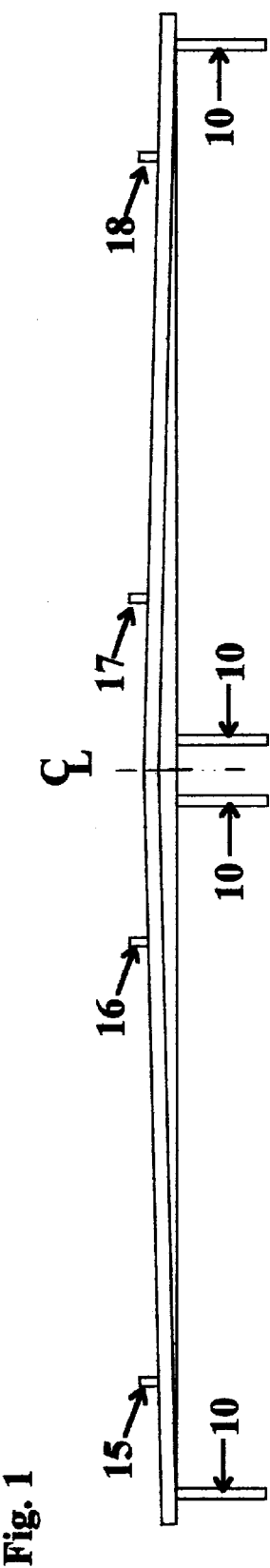
FIG. 1 is a top view of the vehicle dash cover.

The invention sits level , without a slope like the existing dashboard and it enables the vehicle driver to use it as a shelf to place small items on. The four dividers 15, 16, 17 18 on top of the invention.are each 1 inch high See FIG. 1 and FIG. 3. The front edge 13 and back edge 12 and dividers 15 and 18 keep small items from falling off the dash, when the vehicle is in motion. See FIG. 1 and FIG. 3.

I claim:

1. A molded dash cover for use with an existing vehicle dashboard and defroster vent system consisting of main body including at least one aperture.

* * * * *